Oct. 26, 1937.  J. MIYAZAKI  2,097,226
ELECTRIC METER
Filed Oct. 30, 1934
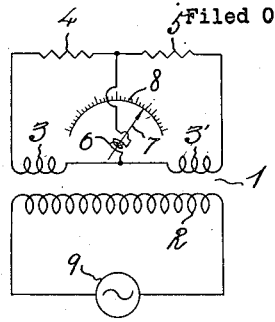
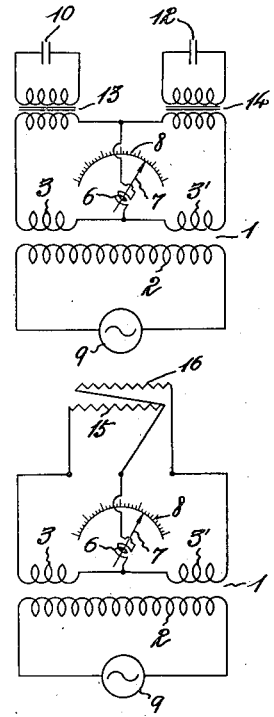
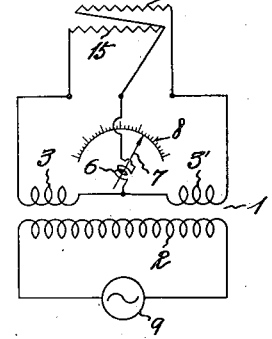
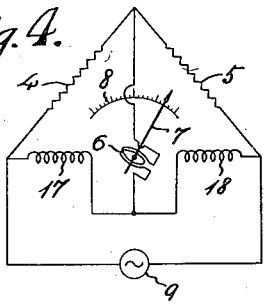
INVENTOR.
Jisuke Miyazaki.
BY Glascock, Downing & Seebold
ATTORNEYS.

Patented Oct. 26, 1937

2,097,226

UNITED STATES PATENT OFFICE 2,097,226

ELECTRIC METER

Jisuke Miyazaki, Yodobashi-ku, Tokyo, Japan

Application October 30, 1934, Serial No. 750,722
In Japan December 6, 1933

3 Claims. (Cl. 171—95)

This invention relates to improvements in electric meters.

In general, the electric measurements are divided into two classes, namely, the zero method and the deflection method. The accuracy of the zero method is far greater than that of the deflection method, but the former requires more time and trouble compared with the latter. On the contrary, the deflection method allows quick and simple measurement, but its accuracy may not be relied upon.

The principal object of this invention is to provide a self-indicating electric meter whereby the accuracy of zero method is maintained and the deflection of the pointer may be directly read.

Another object of this invention is to provide an electric meter whereby the pointer may be deflected by the current passing through the galvanometer arm of an electric bridge and the bridge is automatically balanced as the pointer is moved, the pointer being stopped in the deflected position when the bridge is balanced to allow the direct reading of the measurement.

Further object of this invention is to provide an electric meter of self-deflecting type whereby the same reading may be obtained irrespective of the voltage applied to the meter.

Various electric remote control or indicating systems have been proposed in which the pointer may be deflected by the current passing through the galvanometer arm of a Wheatstone bridge and the bridge is automatically balanced as the pointer is moved, the pointer being stopped in the deflected position when the bridge is balanced to allow the direct reading of the pointer. But such principles are not used for measuring purposes, because such systems are too rough. All such prior systems vary the resistance or capacitor to rebalance the bridge. If the pointer is used as the sliding contactor of the resistance inserted in the bridge arms, the mechanical sliding resistance will be too heavy a load for the pointer of this kind. The same objection will also be observed if one plate of a variable condenser is carried on the pointer. All such features render it impossible to adopt the same principle in the measuring art.

This invention rebalances the bridge by varying the mutual inductances between the moving coil attached to the pointer and the inductance coils connected in two arms of a Wheatstone bridge, so that the pointer has no mechanical load and its sensitivity is very much increased.

My invention will be better understood from the following description when considered in connection with the accompanying drawing and its scope will be pointed out in the appended claims.

In the accompanying drawing, Fig. 1 illustrates an electric meter embodying this invention; Fig. 2 is a modification of Fig. 1 for measuring capacitance; Fig. 3 illustrates a temperature indicator embodying this invention; Fig. 4 shows another modification of this invention.

In these figures the same reference characters are used to designate similar parts for the simplicity of explanation.

Referring to Fig. 1, 1 represents a transformer and 2 is its primary winding. The secondary winding of the transformer 1 is divided into sections 3 and 3' and an alternating magnetic field is produced by the primary winding 2. The secondary windings 3 and 3', the resistance 4 under measurement and another resistance 5 are connected in four impedance arms of an impedance bridge. A moving coil 6 is inserted in the galvanometer arm of the impedance bridge and is adapted to be rotated in the magnetic field produced by the primary winding 2. The moving coil 6 stands in a close relation with the secondary windings 3 and 3' so that the rotation of the coil 6 will change the mutual inductances between the coil 6 and the windings 3 and 3' respectively. The moving coil 6 moves with the pointer 7 of the meter. 8 designates a reading scale and 9 is an alternating current source for energizing the bridge. It should be noted that the moving coil 6 or the pointer 7 has no restoring bias means as in usual meters using the principle of zero method and it may be stopped in any deflected position.

The operation of the meter is as follows: The resistance 4 under measurement is inserted into an arm of the impedance bridge and the bridge is energized from the source 9. If the bridge is unbalanced, current will flow through the moving coil 6. The moving coil 6 is rotatably arranged in an alternating magnetic field produced by the primary winding 2. If current passes through the moving coil 6, the coil 6 will be subjected to a torque due to the electro-magnetic force produced by the inter-action between the current passing through the coil 6 itself and the magnetic field in which the coil 6 is located. The rotation of the coil will change the mutual inductances between the coils 6 and 3 and 3' respectively and thus the impedance ratio of the bridge arms will be automatically changed to rebalance the bridge, that is, the current passing through the moving coil 6 becomes zero. Then, the moving coil 6, and hence the pointer 7 stops in the deflected position and the result of the measurement may be read directly on the scale 8. The pointer 7 may be rotated in either direction and the pointer 7 will give the precise result no matter in what position the pointer 7 is originally situated. When the bridge is unbalanced, as when a resistance 5 whose value is different from resistance 4 is inserted in the circuit, a definite potential difference responsive to the value of resistance 5 is produced across the moving coil to cause current to flow through the coil 6. If the coil 6 varies its angular position with respect to the coils 3 and 3' and induces an electromotive force opposite and equal to the former potential difference across the moving coil, then the bridge will rebalance. The rebalance of bridge is reached experimentally as well as theoretically.

In Fig. 2, the impedance bridge is constituted by the secondary windings 3 and 3' of the transformer 1 and the capacitors 10 and 12. These capacitors 10 and 12 are associated with the bridge arms through potential transformers 13 and 14. This arrangement may be used for measuring capacitance.

Fig. 3 illustrates a temperature indicator in which two resistors 15 and 16 having positive and negative temperature coefficient respectively, are connected in the impedance bridge arms and these resistances 15 and 16 are adapted to be inserted as a unit into the desired place where the temperature is to be measured. By calibrating the scale with temperature, the desired temperature may be read directly thereon.

Fig. 4 illustrates another modification in which the transformer 1 of Fig. 1 is omitted. Instead, two inductance coils 17 and 18 are inserted in the bridge arms to produce magnetic fields around the moving coil 6 and also to serve as the impedance elements of the bridge. An alternating current source 9 is connected directly across the bridge. The rotation of the moving coil 6 will vary the mutual inductance between the coil 6 and the coils 17 and 18 respectively and the bridge is automatically balanced.

In all of the above mentioned embodiments, the pointer 7 stops when there is no current passing through the coil 6. Accordingly, the indication will be independent of the source of voltage or frequency.

While I have shown and described my invention in considerable detail, I do not desire to be limited to the exact arrangements shown but seek to cover by the appended claims all those modifications that fall within the true spirit and scope of my invention.

What I claim as new and desire to secure by Letters Patent of the United States, is:

1. An electric meter, in combination, an impedance bridge, a transformer having its secondary winding divided into two sections which are inserted in two adjacent arms of said bridge, the primary winding generating an alternating magnetic field, an alternating current source connected across the primary winding of said transformer, a moving coil inserted in the galvanometer arm of said bridge in close relation with said two secondary windings so as to be rotated in said alternating magnetic field produced by the said primary winding to induce rebalancing electromotive force as said moving coil is rotated, thereby automatically balancing said bridge, a pointer attached to said moving coil and adapted to be stopped in the deflected position and a scale co-operating with said pointer.

2. An electric meter, in combination, an impedance bridge having impedances connected in the bridge arms through instrument transformers, a transformer having its secondary winding divided into two sections which are inserted in two adjacent arms of said bridge, the primary winding generating an alternating magnetic field, an alternating current source connected across the primary winding of said transformer, a moving coil inserted in the galvanometer arm of said bridge in close relation with said two secondary windings so as to be rotated in said alternating magnetic field produced by the said primary winding to induce rebalancing electro-motive force as said moving coil is rotated, thereby automatically balancing said bridge, a pointer attached to said moving coil and adapted to be stopped in the deflected position and a scale co-operating with said pointer.

3. An electric meter, in combination, an electric bridge having, at least two inductance coils inserted in two adjacent arms, said inductance coils generating a magnetic field, a moving coil inserted in the galvanometer arm of said bridge to be rotated in said magnetic field, said moving coil being arranged in so close relation with said inductance coils that a rebalancing electro-motive force is induced in the moving coil as said moving coil is rotated to automatically balance the said bridge, an alternating current source for energizing the bridge, a pointer attached to said moving coil and a scale co-operating with said pointer.

JISUKE MIYAZAKI.